Nov. 16, 1954    S. H. NORTON    2,694,659
INDUCTION HEAT TREATMENT METHOD
Filed Sept. 29, 1950    3 Sheets-Sheet 1
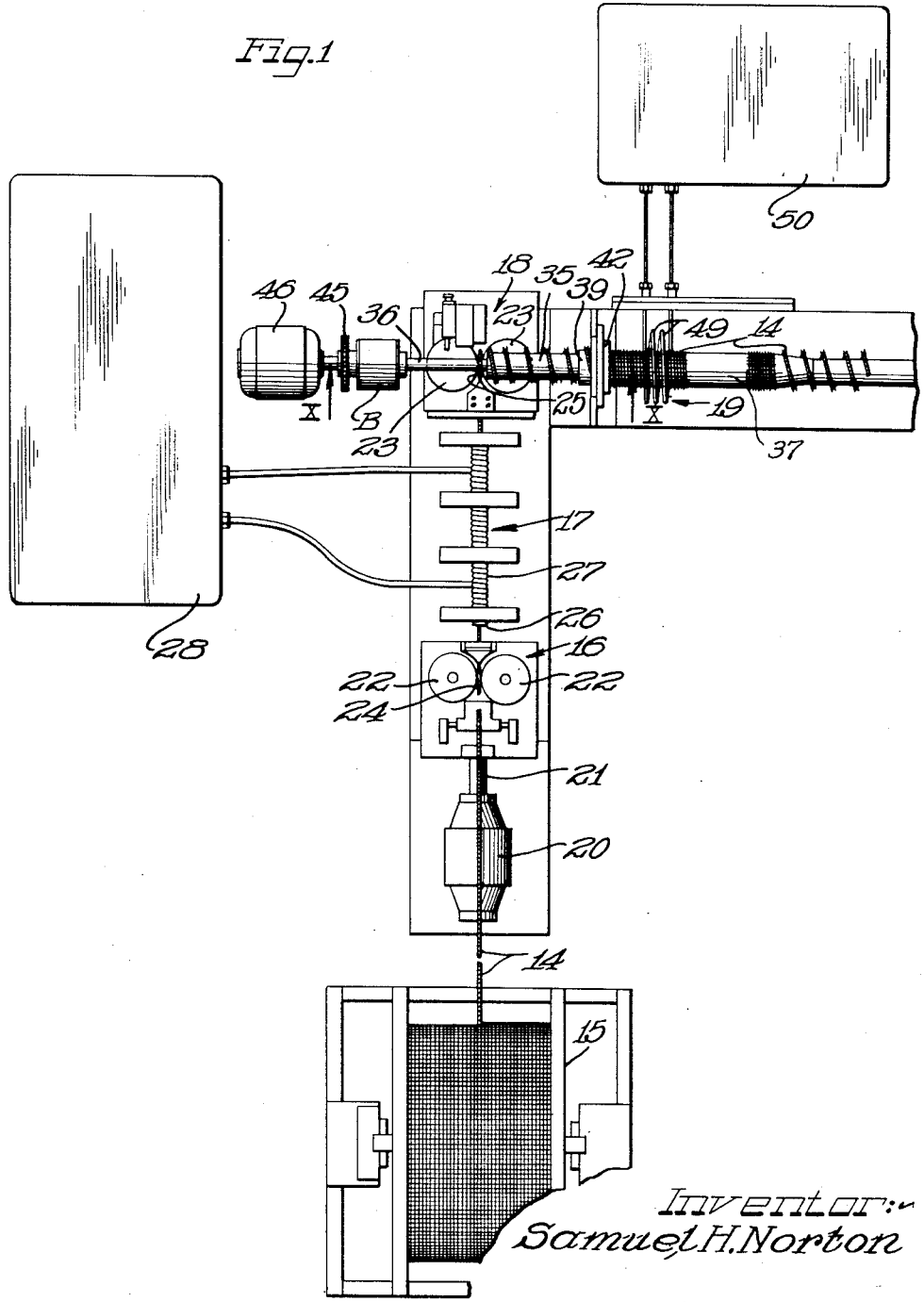
Inventor:
Samuel H. Norton
by Hill, Sherman, Meroni, Gross & Simpson Attys Nov. 16, 1954    S. H. NORTON    2,694,659
INDUCTION HEAT TREATMENT METHOD
Filed Sept. 29, 1950    3 Sheets-Sheet 2
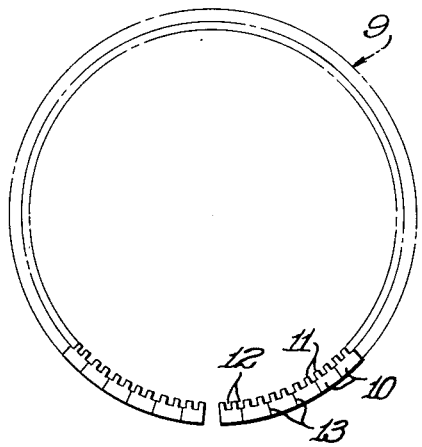
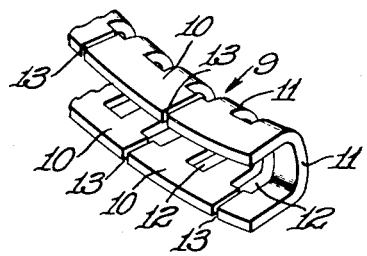
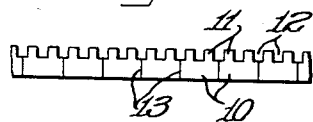
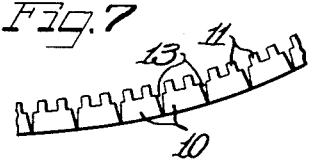
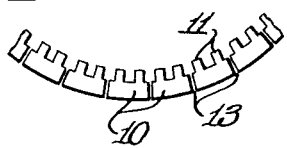
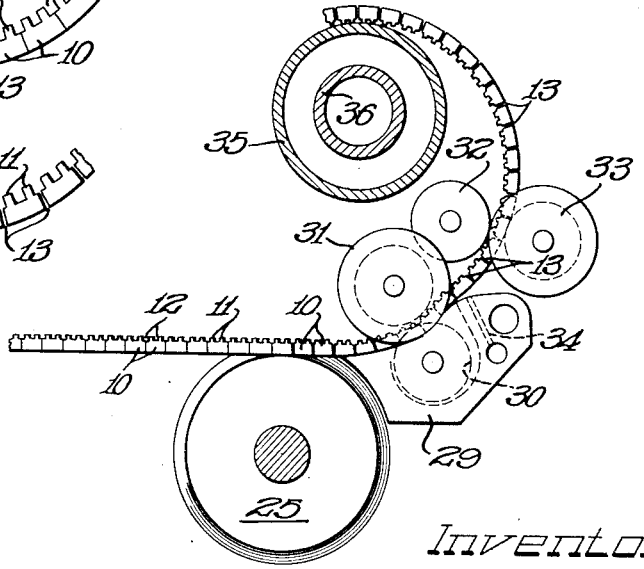
Inventor:
Samuel H. Norton
by Hill, Sherman, Meroni, Gross & Simpson Attys Nov. 16, 1954  S. H. NORTON  2,694,659
INDUCTION HEAT TREATMENT METHOD
Filed Sept. 29, 1950  3 Sheets-Sheet 3

Inventor:
Samuel H. Norton
by Hill, Sherman, Meroni, Gross & Simpson Attys

United States Patent Office 2,694,659
Patented Nov. 16, 1954

2,694,659

INDUCTION HEAT TREATMENT METHOD

Samuel H. Norton, University Heights, Ohio, assignor to Thompson Products, Inc., Cleveland, Ohio, a corporation of Ohio Application September 29, 1950, Serial No. 187,508

6 Claims. (Cl. 148—10)

This invention relates to a heat treatment method and apparatus whereby the material being treated is protected against excessive temperatures by a coating having an appreciable latent heat absorption capacity at the upper limit of the heat treatment temperature.

Specifically, the invention deals with the protection of coiled strip or strand material on a mandrel or arbor in an induction furnace by coating the coils with a material such as oil having a boiling point close to the upper limit desired for the heat treatment so that the coating will absorb heat by induced current in coils having poor contact with the arbor.

While this invention is generally useful in the heat treatment of any elongated strip or strand material, such as wires, ribbons, and the like shapes, it will be hereinafter specifically described as embodied in the heat treatment of piston ring material for the production of piston rings such as are disclosed in the Bowers Patent 2,345,176.

In accordance with this invention, channel-shaped piston ring material strip stock preferably composed of a tool steel which may be hardened, such as S. A. E. 1095 steel containing 0.95% carbon, is first heated to hot forging or hot working temperatures around 1540° F., is then hot forged into desired shape, is then coiled into ring shape, quenched, and passed through an induction furnace for drawing or tempering the quench-hardened coil. This draw furnace heats the coil to temperatures around 600 to 650° F. on a mandrel or arbor and following the drawing treatment the coils are air quenched.

Since it is desired to effect the drawing treatment in an induction furnace, and since the coils may not always have good electrical contact with the mandrel or arbor on which they are supported, there is a possibility that some of the ungrounded coils will act in the nature of a transformer and will pick up induced current generating additional heat, so that the drawing temperature cannot be accurately controlled. The heating effect of this picked up induced current in the ungrounded coils may be much greater than the heat supplied by the induction coils, thereby destroying the tempering effect produced by the draw treatment. At points where the coils touch the arbor or mandrel, the induced currents will be shorted out and will do no harm. Since it is difficult or impossible to control the contact between the coils and the arbor, various sections of the coil strip will be drawn soft due to excessive temperatures, while other sections will be satisfactory.

This invention now insures the production of uniformly drawn or tempered metal coils in an induction furnace by coating the material to be heat treated with a material that has an appreciable latent heat absorption capacity at the upper temperature limit desired for the heat treatment. In the case of the herein specified piston ring material, oil having a boiling point around 600° F. has been found to be especially satisfactory. However, any material that will gasify, boil, or in any manner go through a change of phase requiring absorption of heat without increase in temperature is satisfactory. The material, of course, should possess coating properties in order that it may be retained on the coils during their passage through the induction furnace.

Since, in the preferred embodiment of the invention, the piston ring material is to be quenched before it is drawn in the induction furnace, the coating material may also be used as a quenching medium.

It is, then, an object of this invention to prevent overheating of materials being heat treated by coating the materials with another material having a high latent heat capacity at the upper temperature limit desired for the heat treatment.

Another object of the invention is to provide a method for preventing development of excessive temperatures in metal coils passing through an induction heating furnace by coating the coils with a material having a high latent heat absorption capacity so that stray currents picked up in the coils will not raise the temperature of the coils above the treating temperature.

Another object of the invention is to utilize a quenching medium for preventing development of excess temperatures in a subsequent heat treatment through its capacity to absorb heat without raising temperature.

Another object of the invention is to provide a heat treating method involving a hot forging operation, a quenching operation, and an induction drawing treatment wherein the drawing temperatures are maintained below predetermined upper limits by the quenching medium remaining on the material being drawn.

A specific object of the invention is to provide method and apparatus for heat treating piston ring material, whereby an induction heat treatment is effected on coiled material coated with an oil that will boil to prevent overheating of any of the coils.

Other and further objects of the invention will be apparent to those skilled in the art from the following detailed description of the annexed sheets of drawings, which, by way of preferred example only, illustrate a machine for forming and heat treating piston rings in accordance with this invention.

On the drawings:

Figure 1 is a plan view of a machine for hot forging, coiling, and drawing piston ring material to develop desired spring temper characteristics.

Figure 2 is a plan view of a piston ring heat treated in accordance with this invention.

Figure 3 is a fragmentary isometric view of the piston ring of Figure 2.

Figure 10:
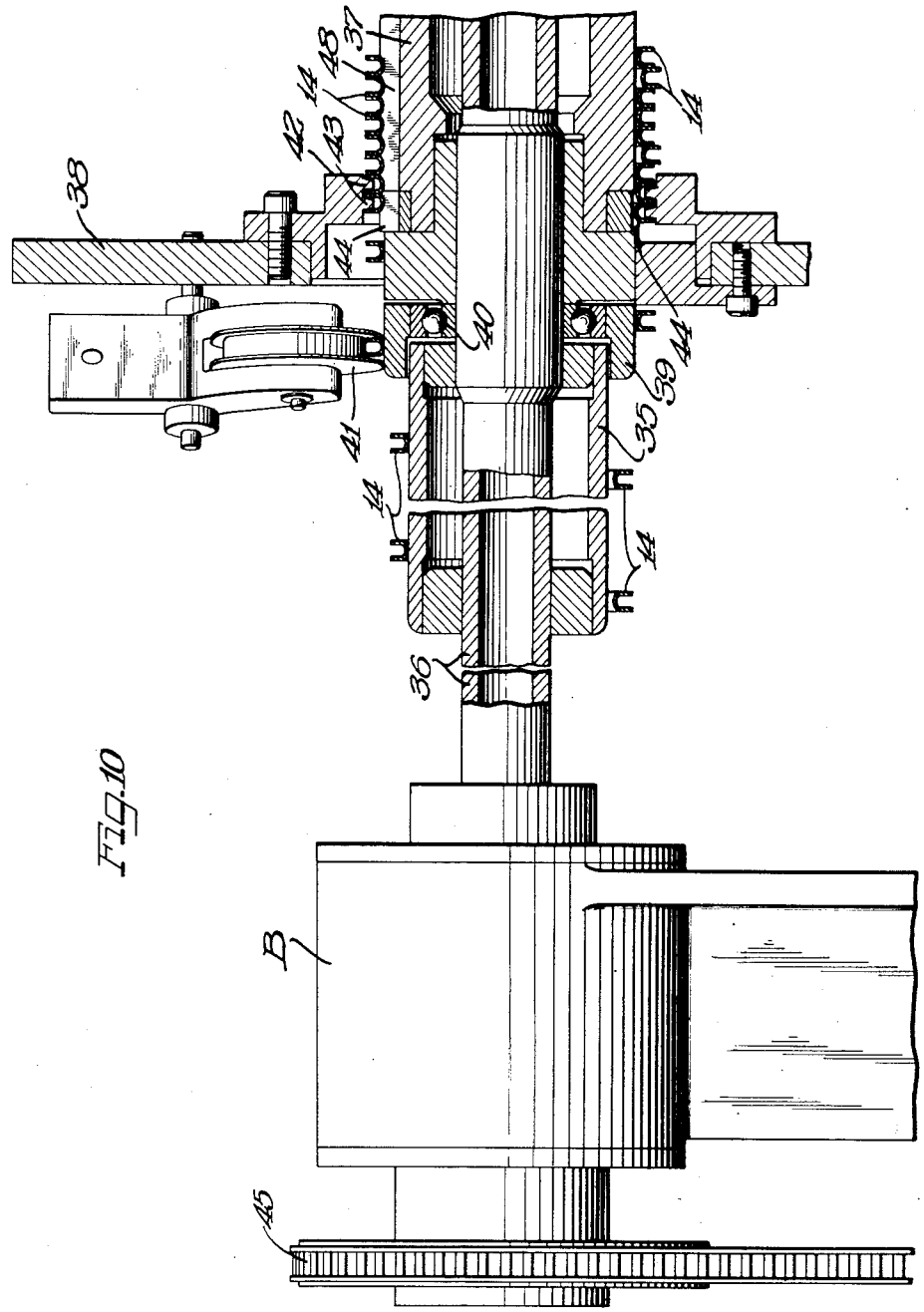

Figures 4 to 8 inclusive are fragmentary views illustrating various stages in the formation of the piston ring.

Figure 9 is a fragmentary detail view illustrating the coiling and quenching of piston ring material.

Figure 10 is an enlarged fragmentary longitudinal cross-sectional view, with parts in elevation, taken along the line X—X of Figure 1.

As shown on the drawings:

The piston ring 9 shown in Figures 2 and 3, which is formed and heat treated in accordance with this invention, is composed of any suitable steel which may be hardened and tempered to develop desired spring properties. The ring includes two axially spaced apart annular rows of crown segments 10, 10 connected together by a web of ladder-like form having spaced parallel cross-overs or bars 11, 11 connecting the crown segments together and leaving transverse slots 12, 12 between the cross bars. The crown segments 10, 10 are separated by radially extending slits 13, 13 and these slits extend into the slotted portions 12 between the webs. The slits, as shown in Figure 3, are in staggered relation in the spaced apart rows of segments so that no two slits are axially aligned in the ring. The ring is circumferentially expansible and contractible to vary the width of the slits and, since the ring is spring tempered in accordance with this invention, it is resilient so that no inner expander is needed. The ring is especially suitable for an oil control ring in piston and cylinder assemblies.

The ring 9 is formed from a stamped strip of resilient piston ring material 14 coiled on a reel 15 as shown in Figure 1. This piston ring material enters the machine of this invention in the form of a U-shaped channel strip shown in Figure 4, where the slots 12 extend transversely across the channel and where the crowns 10 form the side walls of the channel. The webs 11 provide transverse ribs across the top of the channel.

The apparatus shown in Figure 1 includes a cold rolling mill indicated generally at 16 for rolling the strip to "keystone" the crowns 10 to the shape shown in Figure 5, an induction heating unit 17 for heating the cold rolled strip to hot forging temperatures such as about 1540° F. for S. A. E. 1095 steel, a hot rolling mill indicated generally at 18 for straightening out the deformed crown segments and for finish rolling the crowns to complete the keystoning operation as well as for gapping or spacing the crowns. This hot rolling mill also includes a quenching spray and a coiling mechanism to form quenched, brittle and hard spiral coils. The machine also includes the drawing furnace 19 for tempering the steel coils. The tempered coils are then air quenched.

An electric motor 20 drives a longitudinal shaft 21 which are generally between 600 to 680° F. for anvil rolls 22, 22 in the cold roller portion 16 of the machine and a second pair of horizontal anvil rollers 23, 23 in the hot rolling mill portion 18 of the machine.

A vertical roll 24 cooperates with the first anvil rolls 22, 22 and has a tapered periphery projecting into the channel of the strip 14 backing up the segments 10, 10 of the strip 14 so that pressure of the anvil rolls against the segments will cause a thinning down of the thickness of the segments to cause them to assume the keystone shape shown in Figure 5. A similar vertical tapered roll 25 is provided between the anvil rolls 23, 23 in the hot rolling mill 18.

The strip 14 passes from the cold rolling mill 16 into a quartz tube 26 of the induction furnace 17. A coil 27 surrounds this tube 26 and is energized from a high frequency oscillator 28. The furnace 17 heats the cold rolled strip 14 to hot forging temperatures and the strip is then acted on by the hot rolling mill 19 as best shown in Figure 9. As therein illustrated, the tapered roll 25 further works the segments 10 of the strip and pushes the strip into a shoe 29 where the segments are pushed together as shown in Figure 6. The shoe 29 guides the strip in a curved upward path on the edges of the crown segments and a roll 30 mounted in a recessed portion of the shoe engages the inside faces of the crown of the strip as the outer edges of the crown are held against the curved surface of the shoe by an upper grooved roll 31. The roll 30 serves to flatten the sides of the crown segments against the sides of the groove of the roll 31, thereby eliminating sawtooth edges on the sides of the crown.

The grooved roll 31 positively engages the thinned down outer edges of the crown segment 10 with the curved surface of the shoe causing the crown segments to conform to the shoe and to be pushed together by the anvil feeding rolls so that the strip will assume a ring shape. The shoe at the discharge end of the roll 30 is curved outwardly and downwardly to provide a rounded end over which the strip is bent backwardly to deform or open up the slits 13 between the segments. Rolls 32 and 33 are provided beyond the shoe to bend the strip back over the rounded end of the shoe and to reversely bend the strip back on itself for coiling it into cylinder size with uniform radially extending slits 13 as illustrated in Figure 8. Thus the slits are initially closed as shown in Figure 6, the strip is then bent backward to open up gaps at the inward ends of the slits as shown in Figure 7 and next the strip is bent back on itself into cylinder shape to create radial slits of uniform width.

The thus formed cylindrical coil is then quenched by a spray of oil from an orifice 34 conveniently formed in the shoe 29. This oil quench will harden the metal to a brittle stage and will leave a film of oil on the coils.

The oil is selected to effectively quench the heated strip without decomposing and at the same time to form a film on the strip. The oil should have a boiling point close to the upper temperature limits desired for the drawing heat treatment in the induction furnace 19. Since drawing temperatures around 600° to 680° F. are used to properly temper a steel of the S. A. E. 1095 type, the oil should have a boiling point not above this temperature. While oil is a preferred quenching and coating media, it should be understood that any other quenching and coating material having a relatively large latent heat absorption capacity at the upper temperature limits of the drawing treatment can be used.

The quenched coiled strip is fed from the rolls 32 and 33 around a shaft drum 35 that is mounted on a hollow shaft 36. This hollow shaft 36 extends into and supports the mandrel or arbor 37 for the drawing furnace 19 as best shown in Figure 1.

As shown in Figure 10, a frame support 38 on the machine provides an intermediate support for the hollow shaft 36 carried by a main bearing B. A measuring collar 39 around one end of the drum 20 is rotatably supported from the shaft 36 on bearings 40. This collar has a guide collar 41 cooperating therewith to direct the coiled strip entirely around the collar in a spiral path and into a spiral guide 42 fixedly carried by the support plate 38 and having spiral internal teeth 43 for guiding the coil onto the mandrel 37 of the drawing furnace. This mandrel 37 has spur teeth 44 for engaging in the transverse slots 12 of the piston ring material so as to pull the coils around the collar 39 and through the spiral guide 42. The mandrel is driven through the hollow shaft 36 by a chain and sprocket drive 45 from a motor 46 (Figure 1).

The mandrel 37 has a longitudinal key 48 aligned with one of the teeth 44 to engage in a slot 12 in each coil of piston ring material so as to effect continuous driving engagement of the mandrel with the coil on the arbor.

The induction drawing furnace 19 includes an induction coil 49 energized from a high frequency oscillator 50. In order to cool the mandrel 37, the hollow shaft 36 can flow a coolant into the mandrel as desired.

Unless the coiled strip 14 has each coil thereof thoroughly grounded on the mandrel with each cross web 11 in engagement with the mandrel, the very high frequency alternating current sent through the induction coil 49 will induce a current in the ungrounded section of the coil that is so great that if it builds up through several segments of the coil whose sections are not touching the arbor, it will draw these sections too soft. As shown in Figure 10, however, while the key 48 will firmly ground the coil segments adjacent thereto, some of the segments remote from the key may be spaced from the mandrel. Since the coils on the mandrel have been quenched and are coated with a film of the quenching oil, and since this oil has a high latent heat absorption capacity, the oil will absorb the excess heat generated in the ungrounded coil segments by the thus induced current and will boil without raising the temperature of the ungrounded segments. In this manner, these segments are protected against soft drawing and are maintained within the drawing temperature limits which are generally between 600 to 680° F. for the S. A. E. 1045 type steels.

The coated coil on the arbor 37 is thus protected against overheating by a coating on the coil which has already served a previous function in quenching the coil from its hot forging temperatures.

The properly drawn or tempered coil of piston ring material is then further treated by grinding to size, and cutting into ring segments to produce the finished ring of Figure 2.

From the above descriptions, it will therefore be understood that this invention provides a process and apparatus for producing coiled tempered strip or strand material, and especially piston ring strip material, wherein the drawing operation is maintained well within desired temperature limits by a coating of quenching media previously deposited on the material.

It will be understood that modifications and variations may be effected without departing from the scope of the novel concepts of the present invention.

I claim as my invention:

1. The method of making tempered metal coils which comprises heating a strand of metal to forging temperatures, coiling the heated strand, quenching the coil with a fluid having an appreciable latent heat absorption capacity, forming a coating of said fluid on the quenched coil, winding the coated coil on a grounded mandrel, passing the coil on the mandrel through a high frequency induction furnace, heating the coated coil on the mandrel by high frequency current in said induction furnace, grounding out induced currents in the coil by contact of the coil with the mandrel, and absorbing excess heat induced in poorly grounded segments of the coil by latent heat of vaporization of the coating on the coil.

2. The method of making piston rings which comprises hot forging segmented side walls of a metal channel strip having a slotted web portion, coiling the hot forged strip, quenching the coil with a fluid having a high heat of vaporization, forming a film of the fluid on the quenched coil, wrapping the coil on a grounded mandrel with the slotted web contacting the mandrel, heating the film covered coil on the mandrel to drawing temperatures in an induction furnace, grounding currents induced in the coil segments into the mandrel, and maintaining poorly grounded segments below maximum drawing temperatures by vaporizing the film thereon.

3. The method of making piston rings from a channel shaped strip of metal having the side walls thereof composed of individual segments and the web thereof composed of transversely spaced cross-overs connecting the segments and providing transverse slots in the web which comprises hot forging the segments of the side walls of said strip into keystone shape, bending the hot forged strip into a coil with the keystone segments separated by radially extending gaps, quenching the coil with a fluid having a high latent heat of vaporization, forming a film of the quenching fluid on the coil, wrapping the coil around a rotating mandrel with the slotted web contacting the mandrel, engaging a key on the mandrel in one of the transverse slots of the web, rotating the mandrel to advance the coil thereon along a spiral path, advancing the coil on the mandrel through a high frequency induction furnace, heating the coil in said furnace to drawing temperatures, grounding out stray induced currents in the coil segments on the mandrel by contact of the slotted web portion of the coil with the mandrel, and preventing overheating of the poorly grounded coil segments through latent heat of vaporization of the film on the coil.

4. The method making piston rings which comprises cold rolling the segmented side walls of a metal channel strip to form the segments into keystone shape, heating the cold rolled channel strip to forging temperatures, forging the heated channel strip into a coil with the segments of the channel side walls separated by radially extending gaps of uniform width, oil-quenching the coil, wrapping the coil around a rotating mandrel, advancing the coil on the mandrel through a high frequency induction coil, grounding out stray currents induced in the channel strip on the mandrel by engagement of the strip with the mandrel, and preventing overheating of the ungrounded coil segments by absorbing heat into the oil film on the segments without raising the temperature of the segments.

5. The method of making tempered metal coils which comprises heating metal strand material to forging temperatures, coiling the heated strand, oil quenching the coil, advancing the coil along a spiral path through a high frequency induction furnace, grounding the coil in said furnace, and absorbing excess heat induced by stray currents in poorly grounded segments of the coil by latent heat of vaporization of the oil film on the coil.

6. The method of tempering metal which comprises coating the metal with a fluid having a high latent heat of vaporization, grounding the metal, passing the grounded metal through a high frequency induction furnace, heating the metal in said furnace to drawing temperatures, grounding out stray currents induced in the metal to prevent overheating of the metal, and absorbing into the coating on the metal excess heat induced by stray currents in poorly grounded metal segments.

References Cited in the file of this patent

UNITED STATES PATENTS

| Number | Name | Date |
| --- | --- | --- |
| 1,676,685 | Cammen | July 10, 1928 |
| 2,320,801 | Simons | June 1, 1943 |
| 2,322,777 | Purnell | June 29, 1943 |
| 2,349,569 | Wilson | May 23, 1944 |
| 2,500,566 | Phillips | Mar. 14, 1950 |
| 2,502,770 | Watson | Apr. 4, 1950 |